United States Patent Office

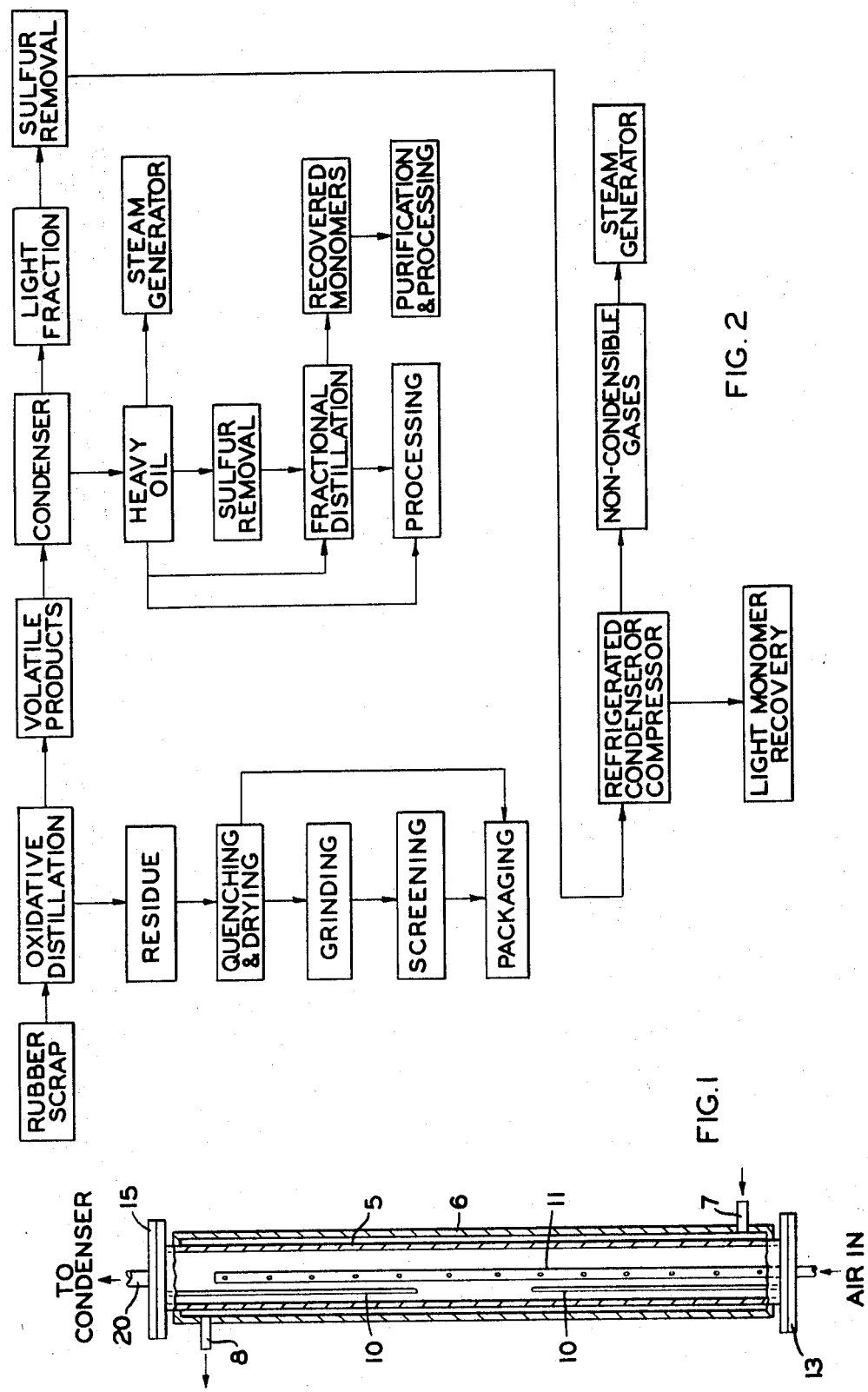

3,582,279
Patented June 1, 1971

3,582,279
OXIDATIVE DISTILLATION OF RUBBER VULCANIZATE
Joseph A. Beckman and Edward L. Kay, Akron, Ohio, assignors to The Firestone Tire & Rubber Company, Akron, Ohio
Filed May 19, 1969, Ser. No. 825,550
Int. Cl. C01b *31/02;* C10b *57/04*
U.S. Cl. 23—209.2                                                           11 Claims

ABSTRACT OF THE DISCLOSURE

This invention relates to oxidative distillation of synthetic rubber vulcanizates (with and without natural rubber) and particularly tires, and obtaining therefrom volatile matter and residue. It also includes the oxidative distillation of the scrap of unvulcanized synthetic rubbers and the production of somewhat different volatile matter and different residue. Both volatile matters and residues may be used for the purposes indicated below.

The volatile matter yields gaseous materials and an oil. The oil comprises a complex mixture of aliphatic, olefinic and aromatic hydrocarbon and oxidation products thereof. Included are monomers, for example butadiene and/or isoprene and/or styrene, and/or isobutylene depending upon the composition of the rubber that is distilled. One or more oil fractions may be collected. They may be polymerized to make a plastic resin suitable for molding, etc. On hydrogenation the oil will form a fuel suitable for internal combustion engines. It may be used as a fuel for the rubber distillation and elsewhere.

The volatile material may be used as a feed stock for a cracking operation in the production of ethylene, propylene, etc.

Residual material as recovered from the retort may be used as a reinforcing agent or filler for rubber vulcanizate, a filtering agent for the purification of water, decolorizing organic materials, sewage treatment, etc.

The gas from both polymer and vulcanizate distillation includes a substantial amount of butadiene, and isoprene monomers.

---

This invention relates to the oxidative distillation of vulcanizate of synthetic rubber scrap (with and without vulcanizate of natural rubber scrap) and the oxidative distillation of unvulcanized synthetic rubber scrap (with and without unvulcanized natural rubber scrap) and the oxidative distillation of mixtures of the foregoing; and includes different distillation products and their use. The oxidative distillation to which the invention relates involves the use of sufficient oxygen to oxidize sufficient rubber to generate the heat required to sustain distillation while minimizing the consumption of rubber and distillation products.

The products of the distillation are volatile matter and carbonaceous residue. The residue is distinguishable from the residue obtained by destructive distillation of rubber because of its oxygenated surface and because of this, where it is used for its surface effect, the result is different. It is not supposed that the oxidation is limited to the surface and, therefore, where used in other ways it gives a different result.

An important intended use for the product is as a filler in rubber products. It has value as a substitute for other fillers as, for example, in mechanical goods including hose, etc. It is a satisfactory replacement for such fillers as powdered coal, etc., sometimes referred to as Austin black and mineral blacks.

The invention relates particularly to the oxidative distillation of scrap tires produced from vulcanizates of synthetic rubbers, viz. polyisoprene, polybutadiene, SBR (butadiene-styrene copolymer) and butyl rubber, and other scrap from these synthetic rubber vulcanizates, and may include scrap natural rubber vulcanizate, and also scrap of unvulcanized synthetic rubbers, viz. polybutadiene, polyisoprene, SBR and butadiene-isobutylene copolymer (butyl rubber), and mixtures of any of the foregoing with or without natural rubber. Tires may be fed to a still without any pre-treatment, or the beads may be first removed and in that event the remaining rubber, including the fabric, may be cut into larger or smaller pieces for feeding to the still. The fabric may first be separated and discarded, but that generally will not be done. Whether the distillation is applied to vulcanized products or to unvulcanized scrap, a valuable oil is obtained as well as a gas and a charcoal-like residue that have substantial value.

During oxidative distillation, gases are evolved. The gases may contain significant amounts of butadiene and isoprene. Monomer which is recovered may be purified and used in the production of rubber polymer, etc.

The oil distillate may be recovered in one or more fractions. These may be treated for the separation of monomers which are present in vulcanized and unvulcanized synthetic rubbers, including butadiene, isoprene, styrene and isobutylene. It will usually be desirable to wash the distillate to remove sulfur oxides. Without separation of the monomers the oil, or a fraction thereof, may be polymerized to make a plastic resin useful for molding, etc.

A still further use for the oil would be for hydrogenation to produce a fuel which may be useful for internal combustion engines.

Another valuable use for the oil is as a fuel oil. A particular use would be as fuel for starting the oxidative rubber distillation of this process.

The charcoal-like residue taken from the retort is designed particularly for use as a rubber additive, but may be used as a soil conditioner or mulch, or in the clarification of sewage, or decolorization of organic materials, or as a filtering agent as, for example, in the purification of water, etc.

The invention is further described in connection with the accompanying drawings, in which—

FIG. 1 is a sectional elevation of pilot plant equipment used for the oxidative distillation of scrap rubber; and FIG. 2 is a flow sheet suggestive of products obtainable from oxidative distillation of such scrap.

In FIG. 1, the still or retort comprises a 4-inch vertical tube 5 in which the distillation takes place. This is enclosed in a 6-inch tube 6 which forms a jacket through which Mobiltherm (an organic heat-exchange medium) or the like is circulated, entering at 7 and returning to the heater through the exit 8. In the tube 5 are the thermocouple tubes 10 and the perforated inlet pipe 11 for air. The bottom flange 13 is removable, and the upper flange 15 is spring-loaded for pressure relief. The outlet tube 20 at the top of the still conducts the distillate to a condenser.

Commercially, a rotary kiln will probably be employed, with any type of suitable heating means. Temperature regulators, etc. will be utilized, and air will be introduced in any manner desired. The kiln or other equipment is initially heated to about 190 to 200° C., and then air is introduced (heated or unheated), and the amount of air is controlled to provide continuous combustion within a desired temperature range, but is limited to minimize the consumption of the raw material and product. Any means may be employed for continuously feeding the scrap rubber to the kiln and removing the oxidized char. This is immediately quenched to prevent continued combustion.

There are many procedures for treating the distillate from oxidative distillation of scrap rubber. FIG. 2 illustrates one possible procedure. The scrap rubber is shown as fed to the still. The oxidative char, which is the residue, will usually be removed continuously, and after quenching and drying (or cooling in an inert atmosphere) the black will be packaged immediately, but will preferably be ground and screened for sizing before packaging.

The volatile products will usually be fractionally condensed to separate at least one heavy and one light oil fraction. The heavy oil fraction may be used as fuel oil for steam generation, etc., or, after sulfur removal, it may be fractionally distilled for the recovery of monomers which on purification may be used in polymerization. The distillate from the fractional distillation may be processed in any desirable manner, as suggested.

The light oil fraction will be recovered in any usual way, usually by fractionation, and with sulfur removal valuable by-products are obtained. The gas and vapor discharge from such treatment may advantageously be refrigerated or compressed for further recovery, and the non-condensible gases may be used for fuel, as in steam generation. The distillate recovered in both of the blocks of FIG. 2 designated for recovery of monomer may comprise at least 5 percent of mono- and/or diolefins.

In charging the still, the tires may be fed whole, and this will be particularly true in a larger still. For a smaller still, the beads will normally first be removed, and the fabric may be separated, but ordinarily, the fabric will not be removed. For a batch still, the rubber will usually be cut into small chunks. Unless tires of a particular type of manufacture are segregated, the tires will comprise a variety of synthetic rubbers. Scrap belts, footwear, etc. may be mixed with the tires or may be substituted for the tires, as well as unvulcanized scrap.

In the type of still shown in FIG. 1, the gases will be carried over to a recovery system such as indicated in FIG. 2. FIG. 2 is a flow sheet showing the delivery of the scrap rubber to the still for oxidative distillation. It shows that the residue will normally be ground and screened and packaged for uses such as those mentioned, although it may be packaged just as it comes from the still. A single condensate may be obtained from the volatile matter, although FIG. 2 shows a condenser for the recovery of heavy oil, and other condensing means for the recovery of a light oil fraction. Usually, approximately 40 percent of the oil boils from 20°–200° C. at atmospheric pressure. The remaining 60 percent of the oil boils above 200° C. The heavy oil may be condensed in two fractions; the first fraction being condensed by a water-cooled condenser at 15° C. The second fraction being condensed in an ice trap at 0° C. The fractions will generally be combined prior to distillation. Styrene may be recovered from the heavy oil, and isoprene may be separately recovered although some may be recovered from the heavy oil. Butadiene and iso-butylene may be recovered subsequently.

The heavy oil after removal of monomer, may be subjected to any desired treatment. Some or all of it may be used for steam generation. Sulfur may be removed from such oil, although this is not required. For other uses, sulfur removal will be necessary, and this is indicated. The usual sulfur washing step is all that will be required for removal of sulfur oxides.

After treatment for removal of sulfur, the heavy oil may be fractionated and particularly valuable fractions will be fractions containing styrene and isoprene. Such fractions may, for example, have boiling ranges of about 15° to 100° C. and 100° to 200° C., respectively. The monomer recovered in such fractions can be purified by known procedures such as superfractionation and extractive distillation, and processed for use in the manufacture of rubber. The remaining heavy oil may be used in a variety of ways as previously discussed as, for example, for hydrogenation to produce a fuel for internal combustion engines.

A light fraction may be separately recovered as shown in the flow sheet, or any such light fraction may be combined with the heavy oil for treatment, as described.

The refrigerated condenser or compressor will be used to cool the gases to about −20° to −10° C. (depending upon the pressure of the operation) for condensation of butadiene (B.P. −4.4° C.) and isobutylene (B.P. −6.6° C.) which may be separated, purified and processed in a known manner. The non-condensable gases include methane, ethane, etc., and these may be recovered and may be purified and used as the industry demands.

The rubber is heated to 190° to 200° C. in the absence of air prior to the distillation. At 200° C. a limited amount of air is admitted to the reactor and an exothermic reaction occurs. The amount of air introduced is controlled to maintain the distillation but is limited so as to minimize oxidation of the starting material and the products. The temperature that is maintained may, for example, be 300° or 1000° C. or any intermediate temperature such, for example, as 400° C. to 750° C.

The distillation may be conducted at sub-atmospheric or super-atmospheric pressure, but will preferably be carried out at atmospheric pressure.

The products obtained in the volatile fraction will depend upon the composition of the still charge and the temperature of operation. For example, at lower operating temperatures, e.g. 200° to 500° C., and thereabout, less hydrocarbon cracking occurs and one obtains higher molecular weight materials in the volatile fraction, while at elevated temperatures, e.g. 600° to 1000° C., and thereabout, the higher molecular weight materials are further broken down into smaller molecular weight materials.

The oil which is recovered by condensation will find a variety of valuable uses. If it still contains all of the monomer or a sufficient portion, it may be polymerized to produce a plastic resin which will be useful for molding and for other usual plastic uses such as coating, etc. Any suitable catalyst may be used to polymerize it, such as, for example, sulfuric acid or other mineral acid, aluminum chloride, or other Lewis acid such as boron trifluoride, etc. The type of polymer resin obtained from the oil will depend upon the composition of the rubber scrap and the temperature at which the distillation is carried out and whether or not the entire oil distillate is polymerized or only a fraction. However, this oil and fractions thereof are of such a nature that on heating to a polymerizing temperature, usually about 200° C. to 300° C., with aluminum chloride or other catalyst in the absence of air, a product of higher molecular weight is produced.

The temperature and the polymerization and recovery conditions will determine the nature of the products produced. The extent of the polymerization will, of course, depend upon the ultimate use to be made of the product. The resinous product may be mixed with fillers, coloring materials, extenders, etc. to produce a valuable resin for electric insulation purposes, containers, decorative materials such as door knobs, drawer pulls, curtain rods, etc.

Another valuable use for the oil is as a feed for hydrocarbon crackers.

The oil may be used as a fuel oil and it may be bled from the system to a burner under the still, and any that is not burned may be recovered in storage. The fuel may be used to generate steam, as for supplying heat to the recovery system of the process.

The residue in the still will usually be recovered as a charcoal-like product. Any fabric in the rubber will have been decomposed with the generation of gases and liquids. Various uses for this charcoal-like product are possible. If the distillation is continued to produce a dry residue, this residue will be charcoal-like, and an important use will be as a filler in rubber. It will first be ground to size. It will be used as other fillers are used in the curing of rubbers, either alone or mixed with other fillers, in amounts of, for example, 10 to 50 or 100 percent of the weight of the rubber, or more.

Another valuable use for the distillation residue is as a filtering and purifying agent for industrial waste water. The residue, as taken from the still, may be sized, as desirable. The industrial waste water or other water is fed to the vessel and filters through the residue and is recovered as purified water. After accumulation of sufficient waste in the residue, backwash water is introduced up through the bed of the residue and sludge which is liberated is removed as indicated. Then the process is repeated. The residue will be replaced as required. Other equipment may be used, and any desirable temperature and time of treatment may be used.

Another use for the dry residue from the distillation is as a soil conditioner. It will be disintegrated to the proper size, such as sand size, and then worked into soil such as clayey soil to soften it, as peat moss and the like are now worked into soil. More or less will be used, depending upon the condition of the soil and the use to which the soil is to be put. An advantage is that the residue will not readily disintegrate but will persist for years.

As explained, the distillate is a valuable source of monomers including chiefly butadiene, isoprene, styrene and isobutylene. In a recovery system in which these are the valuable products obtained, the entire distillate may be condensed, and this would comprise a composite condensate which FIG. 2 designates as heavy oil, a light-oil fraction, and the light-oil monomer recovery from a refrigerated condenser or compressor.

It is to be understood that the recovery systems indicated in the accompanying drawings are illustrative, and modifications will be employed as the conditions warrant, and the type of modification will be governed by the products recovered.

The invention is further described in the following example.

EXAMPLE

The reactor of FIG. 1 was charged with 12 lbs. of shredded scrap passenger tires. The upper flange was torqued to relieve at 20 p.s.i. Thermocouples were placed in the thermocouple tubes 10. The Mobiltherm in the jacket annulus was preheated to 450° F. which produced a lower thermocouple temperature of 207° C. Air was then admitted to the reactor at the rate of 0.8 cubic foot per minute until an exothermic reaction initiated. It was approximately five minutes until the exotherm could be detected on the lower thermocouple. By varying the air flow from 0.2 ft.³/min. to 1.3 ft.³/min., the temperature could be controlled between 400 and 740° C. The oxidation was continued for 2.5 hours while controlling the air supply to prevent unwanted decomposition of the rubber vulcanizate or products of the distillation. After cooling, 5.2 lbs. of black carbonaceous residue was removed from the reactor. Approximately 3 lbs. of a dark oil-water mixture was collected in the trap following the condenser. No attempt was made to separate oil fractions at the exit from the still. The vapors from commercial operations may advantageously be fractionally condensed to obtain a fraction composed of at least 5 percent of mono- and/or diolefins. The remaining 3.8 lbs. of starting material can be accounted for by oxidation and by hydrocarbon products which were entrained in the gaseous products and were not condensed.

The scrap was a mixture of many rubbers including, polybutadiene, rubbery butadiene-styrene copolymer, etc.

We claim:
1. The method of obtaining char and distillate by oxidatively distilling rubber vulcanizate which comprises heating the rubber vulcanizate and contacting the rubber vulcanizate with sufficient oxygen to maintain a temperature of oxidative distillation of the rubber vulcanizate, while limiting combustion of the rubber vulcanizate and the products of the distillation to substantially that required to effect the distillation; and by the oxidative distillation producing a char with an oxygenated surface.

2. The process of claim 1 in which the distillation is carried out on a continuous basis and residue of the distillation is immediately quenched.

3. The process of claim 2 in which the quenched product is ground and separated into granular products of different sizes.

4. The process of claim 3 in which a product composed of particles, all of substantially the same size, is separately collected.

5. The process of claim 1 in which the vapors from the distillation are condensed.

6. The process of claim 1 in which the vapors from the distillation are fractionally condensed.

7. The process of claim 6 in which a fraction composed of at least 5 percent of mono- and/or diolefins is separately collected.

8. A charred product composed of charred carbon particles from the oxidative distillation of rubber, which particles are all substantially the same size and at least most of which have an oxidized surface.

9. The process of claim 1 in which the rubber vulcanizate is at least largely old tires from which the beads have been removed.

10. The process of claim 1 in which prior to the distillation the rubber is heated to 190° to 200° C. in the absence of air, and the oxygen which contacts the vulcanizate during the distillation is air and the amount of said air is controlled so that the distillation is carried out at a temperature between substantially 300° and 1000° C.

11. The process of claim 10 in which the distillation is carried out at a temperature between 400° and 750° C.

References Cited
UNITED STATES PATENTS

| 3,011,953 | 12/1961 | Foch | 201—37 |
| 3,097,187 | 7/1963 | Mersereau et al. | 260—2.3 |
| 3,130,132 | 4/1964 | Sanders | 201—36 |
| 3,494,958 | 2/1970 | Mannsfeld et al. | 260—669 |

OTHER REFERENCES

Nagao et al., 66 Chemical Abstracts 77892n (1967).

SAMUEL H. BLECH, Primary Examiner

U.S. Cl. X.R.

23—209.4; 106—307; 201—25; 210—65; 252—421; 260—2.3, 41.5R, 82, 669R, 669P, 680R, 683R